United States Patent
D'Souza et al.

(10) Patent No.: US 12,451,808 B2
(45) Date of Patent: Oct. 21, 2025

(54) OPTIMIZING DEAD-TIME BETWEEN END OF ON-PHASE OF A HIGH-SIDE SWITCH AND BEGINNING OF ON-PHASE OF A LOW-SIDE SWITCH IN A SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Shaoxing Yuanfang Semiconductor Co., Ltd., Zhejiang (CN)

(*) Notice: Subject to any disclaimer, the term of this patent is extended or adjusted under 35 U.S.C. 154(b) by 302 days.

(21) Appl. No.: 18/311,257

(22) Filed: May 3, 2023

(65) Prior Publication Data
US 2024/0128873 A1    Apr. 18, 2024

(30) Foreign Application Priority Data
Oct. 14, 2022   (IN) .............................. 202241058857

(51) Int. Cl.
*H02M 3/158*    (2006.01)
*H02M 1/00*    (2007.01)

(52) U.S. Cl.
CPC ....... *H02M 3/1584* (2013.01); *H02M 1/0009* (2021.05); *H02M 1/0012* (2021.05)

(58) Field of Classification Search
CPC .... H02M 1/0012; H02M 1/0009; H02M 1/38; H02M 3/1584
See application file for complete search history.

(56) References Cited

U.S. PATENT DOCUMENTS

| | | | |
|---|---|---|---|
| 6,396,250 B1 | 5/2002 | Bridge | |
| 7,456,620 B2 | 11/2008 | Maksimovic et al. | |
| 8,289,010 B1 | 10/2012 | Fernald et al. | |
| 9,712,046 B2 | 7/2017 | Sandner et al. | |
| 10,637,348 B1* | 4/2020 | Wu | H03K 17/6871 |
| 10,855,270 B1* | 12/2020 | Colles | H03K 5/133 |

(Continued)

FOREIGN PATENT DOCUMENTS

| | | |
|---|---|---|
| CN | 111293862 A | 6/2020 |
| CN | 113839544 A | 12/2021 |

(Continued)

OTHER PUBLICATIONS

April (Yang) Zhao, One-Step Digital Dead-time Correction For DC-DC Converters, 2010, 06 pages, IEEE.

(Continued)

*Primary Examiner* — Sisay G Tiku
(74) *Attorney, Agent, or Firm* — IPHORIZONS PLLC; Narendra Reddy Thappeta (57) ABSTRACT

A switching converter includes high-side switch, a low-side switch, a first transistor, a second transistor, and a pull-up element. A series arrangement of the first transistor and the second transistor is coupled between a first terminal of the pull-up element and a first constant reference potential. A second terminal of the pull-up element is coupled to a second constant reference potential. A control terminal of the first transistor is coupled to a junction of the high-side switch and the low-side switch. A control terminal of the second transistor is coupled to the control terminal of the low-side switch. A voltage at a junction of the pull-up element and the series arrangement represents a binary-level overlap indicator that indicates whether an ON-duration of the high-side switch overlaps with an ON-duration of the low-side switch. A control loop in the switching converter dynamically adjusts the falling dead-time based on the overlap indicator.

17 Claims, 7 Drawing Sheets

(56) References Cited

U.S. PATENT DOCUMENTS

| | | |
|---|---|---|
| 2004/0189269 A1 | 9/2004 | Lynch |
| 2005/0057228 A1 | 3/2005 | Shih |
| 2008/0298101 A1 | 12/2008 | Kim et al. |
| 2015/0256074 A1 | 9/2015 | Biondi et al. |
| 2018/0234016 A1* | 8/2018 | Acar ................ H02M 1/38 |
| 2018/0323696 A1* | 11/2018 | Gammie ............ H02M 1/088 |
| 2018/0331682 A1 | 11/2018 | Duduman et al. |
| 2021/0328510 A1* | 10/2021 | Tang ............... H02M 3/1586 |
| 2023/0188132 A1* | 6/2023 | Colles ............... H02M 3/158 327/109 |
| 2024/0250600 A1* | 7/2024 | Penttonen ......... H02M 1/0058 |
| 2024/0313631 A1* | 9/2024 | Ni ................... H02M 1/0048 |

FOREIGN PATENT DOCUMENTS

| | | |
|---|---|---|
| EP | 3514930 A1 | 7/2019 |
| WO | 2019200817 A1 | 10/2019 |

OTHER PUBLICATIONS

Romain Grezaud, A Gate Driver With Integrated Dead-Time Controller, 2015, 13 pages, IEEE.

Zheyu Zhang, Model Based Dead-Time Optimization for Voltage Source Converters Utilizing Silicon Carbide Semiconductors, 2016, 10 pages, IEEE.

Nathan Schemm, Optimizing Efficiency Through Dead Time Control with the LMG1210 GaN Driver, https://www.ti.com/lit/an/snva815a/snva815a.pdf?ts=1671509850757&ref_url=https%253A%252F%252Fwww.google.com%252F, Nov. 2018, 10 pages, Texas Instruments Incorporated.

Steve Mappus, Predictive Gate Drive Boosts Synchronous DC/DC Power Converter Efficiency, Apr. 2003, 26 pages, Texas Instruments Incorporated.

* cited by examiner

OPTIMIZING DEAD-TIME BETWEEN END OF ON-PHASE OF A HIGH-SIDE SWITCH AND BEGINNING OF ON-PHASE OF A LOW-SIDE SWITCH IN A SWITCHING CONVERTER

PRIORITY CLAIM

The instant patent application is related to and claims priority from the co-pending India provisional patent application entitled, "Adaptive falling deadtime control", Serial No.: 202241058857, Filed: 14 Oct. 2022, which is incorporated in its entirety herewith to the extent not inconsistent with the description herein.

BACKGROUND

Technical Field

Embodiments of the present disclosure relate generally to switching converters, and more specifically to optimizing dead-time between end of on-phase of a high-side switch and beginning of on-phase of a low-side switch in a switching converter.

Related Art

Switching converters refer to components which convert an input AC (alternating current) or DC (direct current) voltage of one magnitude to an output regulated DC voltage of a desired magnitude by employing and operating switch (es), as is well known in the relevant arts. Switching converters find use as stand-alone power supplies, in voltage regulator modules, etc., used in several environments such as laptops, mobile phones, etc.

Switching converters may be standalone components or be part of a larger system such as a Voltage Regulation Module (VRM). When implemented as part of a VRM, a switching converter may be implemented as separate components, for example, as a Smart Power Stage (SPS) and a controller (or portion thereof), as is also well known in the relevant arts.

Switching converters (and SPS) are typically implemented based on a pair of transistors referred to as high-side (HS) switch and low-side (LS) switch coupled in half-bridge configuration, as is well known in the relevant arts. Each of the switches operates in respective alternating sequences of ON and OFF phases. The switch operates as an open path during its OFF phase and closed to conduct during its ON phase, as is well known in the relevant arts. The operation of such a pair of transistors is often characterized by a 'dead-time', which refers to the time interval between the end of ON phase of one switch and the start of the corresponding ON phase of the other switch. Specifically, the time duration between end of ON phase of the LS switch and start of ON phase of the HS switch is commonly known as "rising dead-time", and the time duration between end of ON phase of the HS switch and start of ON phase of the LS switch is commonly known as "falling dead-time".

It is generally desirable to maintain the "falling dead-time" to be as short as possible to minimize loss in efficiency of the switching converter.

In addition, it is desirable to also prevent or at least minimize overlap between a high-side switch's ON phase and the following low-side switch's ON-phase to prevent shoot-through current between the power source and ground which can damage the devices.

Aspects of the present disclosure are directed to optimizing dead-time between end of on-phase of a high-side switch and beginning of on-phase of a low-side switch in a switching converter.

BRIEF DESCRIPTION OF THE VIEWS OF DRAWINGS

Example embodiments of the present disclosure will be described with reference to the accompanying drawings briefly described below.

DETAILED DESCRIPTION

1. Overview

According to an aspect of the present disclosure, a switching converter includes high-side switch, a low-side switch and an overlap detector. The overlap detector includes a first transistor, a second transistor, and a pull-up element. A series arrangement of the first transistor and the second transistor is coupled between a first terminal of the pull-up element and a first constant reference potential. A second terminal of the pull-up element is coupled to a second constant reference potential. A control terminal of the first transistor is coupled to a junction of the high-side switch and the low-side switch. A control terminal of the second transistor is coupled to the control terminal of the low-side switch. A voltage at a junction of the pull-up element and the series arrangement represents a binary-level overlap indicator that indicates whether an ON-duration of the high-side switch overlaps with an ON-duration of the low-side switch. The switching converter include a control loop to dynamically adjust the falling dead-time based on the overlap indicator.

In an embodiment, the control loop includes the overlap detector, an UP/DN counter, and a delay generator. The binary-level overlap indicator is provided as input to the UP/DN (up/down) counter. The UP/DN counter increments its present count value if the overlap indicator indicates overlap, but decrements its present count value if the overlap indicator no-overlap. The delay generator receives the updated count value from the UP/DN counter and delays the next rising edge of the gate drive signal of the low-side switch.

Several aspects of the present disclosure are described below with reference to examples for illustration. However, one skilled in the relevant art will recognize that the disclosure can be practiced without one or more of the specific details or with other methods, components, materials and so forth. In other instances, well known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
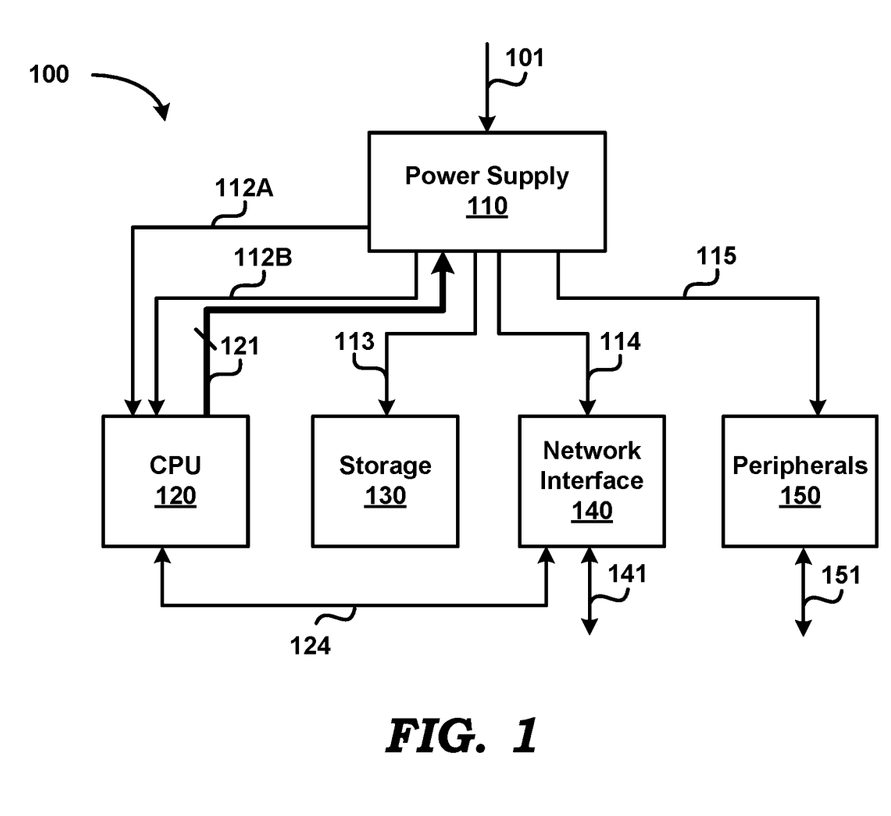
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in path 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency".

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general internet. Network controller 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 communicates with external systems and CPU 120 on path 141 and path 124 respectively.

Peripherals 150 represents one or more peripheral circuits, such as for example, speakers, microphones, user interface devices, etc. Peripherals 150 receives a power supply on path 115, and communicates with external devices on path 151.

Power supply 110 receives one or more sources of power (e.g., battery) on path 101, and operates to provide the desired power supply voltages on paths 112A, 112B, 113, 114 and 115. In an embodiment, power supply 110 is designed to contain one or more DC-DC converters within to generate the power supply voltages. Power supply 110 responds to signals from CPU 120 received on path 121 to reduce/increase current output based on the specific signal (e.g., PS1, PS2 and PS3).

In an embodiment, power supply 110 is a voltage regulator module (VRM), sometimes also called processor power module (PPM), and contains one or more step-down switching (buck) converters to generate several smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module

Figure 2:
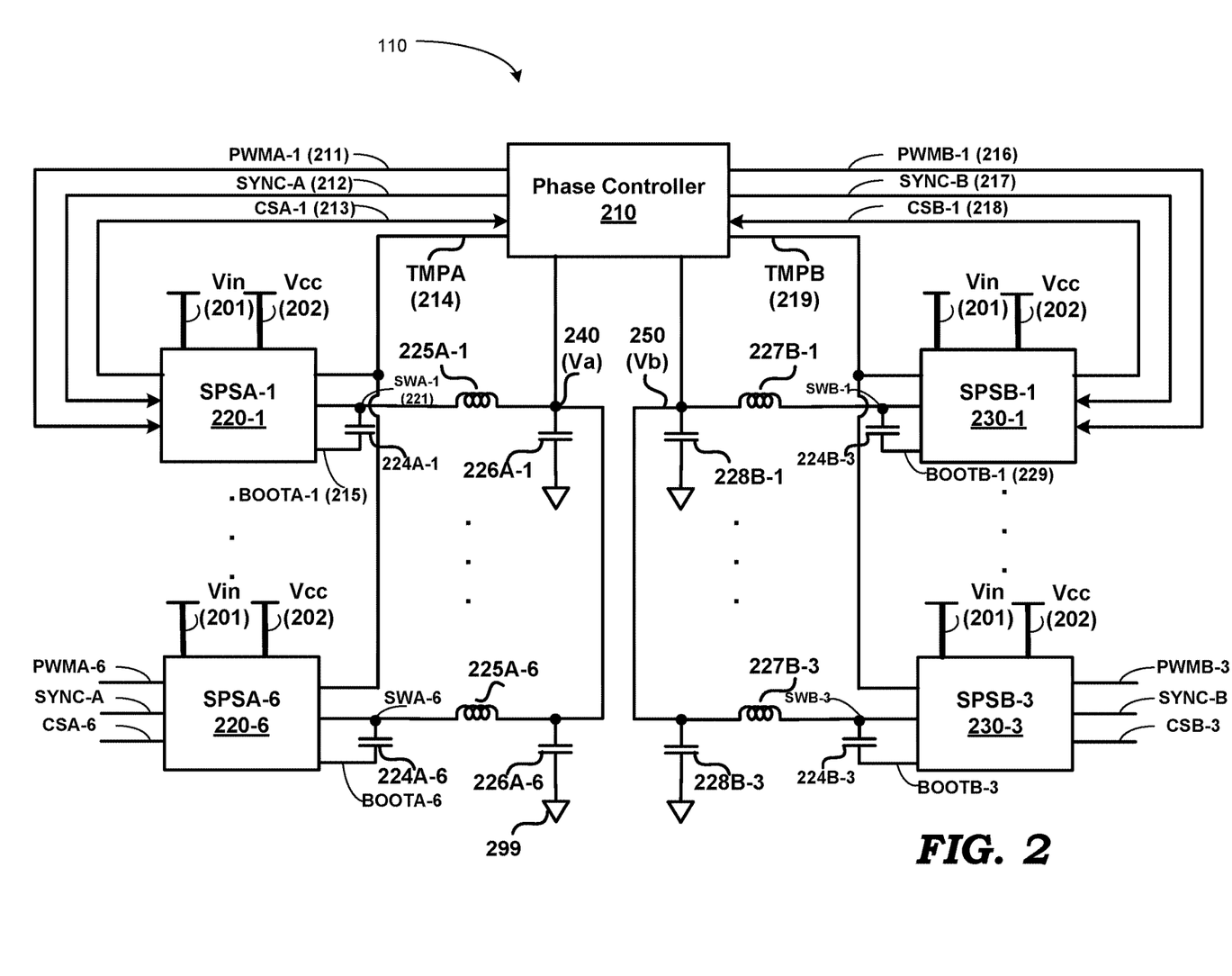
FIG. 2 is a block diagram illustrating the details of a Voltage Regulator Module (VRM) in an embodiment of the present disclosure.

FIG. 2 is a block diagram illustrating the details of a Voltage Regulator Module (VRM) in an embodiment of the present disclosure. Power supply 110 is implemented as a VRM and is shown containing phase controller 210, smart power stages (SPS) SPSA-1 (220-1) through SPSA-6 (220-6), SPSB-1 (230-1) through SPSB-3 (230-3), inductors 225A-1 through 225A-6, 227B-1 through 227B-3, output capacitors 226A-1 through 226A-6, 228B-1 through 228B-3, and bootstrap capacitors 224A-1 through 224A-6, 224B-1 through 224B-3. Each bootstrap capacitor associated with an SPS is shown connected between respective nodes SW and BOOT of the corresponding SPS. Thus, bootstrap capacitor 224A-1 is shown connected between node SWA-1 (221) and BOOTA-1 (215). Although bootstrap capacitor is shown connected external to each SPS, in alternative embodiments, bootstrap capacitor may be internal to the SPS.

Power supply Va (240) is generated by a 6-phase buck converter (there are six SPSes—220-1 through 220-6), while power supply Vb (250) is generated by a 3-phase buck converter (there are three SPSes—230-1 through 230-3). Nodes/Paths 240 and 250 correspond to paths 112A and 112B respectively of FIG. 1. In the interest of conciseness, other power supply circuits that generate supplies on paths 113, 114 and 115 are not shown in FIG. 2.

Phase controller 210 performs regulating functions to enable the generation of regulated voltages Va and Vb. Accordingly, Va and Vb are shown as being provided as inputs to phase controller 210, to enable operation of one or more feedback loops within phase controller 210 to regulate Va and Vb. Phase controller 210 also receives inductor-current information (current flowing through each of the inductors) from each of the SPSes to enable various operations such as current-mode control of voltage regulation, current limiting, short circuit protection, and balancing the currents generated by each SPS of a same converter so as to make the currents from each SPS of a converter to be substantially equal in magnitude.

The combination of (corresponding circuitry within) phase controller 210, an SPS, an inductor and a capacitor forms one "phase" of each multi-phase buck converter. Thus, for example, SPSA-1, inductor 225A-1, capacitor 226A-1, and the corresponding portion within phase controller 210 represent one phase of the 6-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage.

It may be appreciated that the combination of phase controller 210 and one set of SPSes operates as a switching converter to provide a regulated output voltage. The term 'switching converter' as used herein includes a stand-alone switching converter (i.e., a non-multi-phase converter), a switching converter of a multi-phase voltage regulator or multi-phase regulator module having several independent switching converters, and also a portion of a switching converter, such as for example, a smart power stage (SPS).

Each SPS may be implemented to contain a high-side switch, a low-side switch, gate-drive circuitry for the two switches, current-sense block and other circuits (not shown). An example of such 'other circuits' includes, but is not limited to, a temperature-monitor circuit to measure temperature of the SPS and to provide the temperature to phase controller 210. The current-sense block of an SPS measures/senses and/or estimates the magnitude of inductor-current through the inductor of that phase, and provides such inductor-current information to phase-controller 210.

Each SPS receives a source of power as an input which is connected to the high-side switch (shown in detail in sections below). In FIG. 2, the supply source is numbered 201, and has a voltage Vin. Typical value of Vin in a VRM is about 21 volts (V). Each SPS is also shown as receiving bias voltage Vcc on path 202. Typical value of Vcc in a VRM is about 3.3 V, and Vcc is a regulated voltage and may be provided by a voltage regulator (not shown, but which may be within phase controller and separate from the switching regulators and SPSes of FIG. 2) or from a source external to the VRM.

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TMPA (214). SPSA-6 communicates with phase controller 210 via signals PWMA-6, SYNC-A, CSA-6 and TMP (214). Similarly, SPSB-1 is shown connected to phase controller 210 through signal/paths PWMB-1 (216), SYNC-B (217), CSB-1 (218) and TMPB (219). SPSB-3 communicates with phase controller 210 via signals PWMB-3, SYNC-B, CSB-3 and TMP (219). The other SPSes would have similar connections with phase controller 210.

Signal PWM is an input to an SPS and is a pulse-width modulated (PWM) signal. Signal PWM is a fixed-frequency, variable duty-cycle signal, although its frequency is potentially modifiable by phase controller 210 based various operating considerations. A cycle/period of signal PWM consists of a first interval in which only the high-side (HS) switch of SPS is ON, and a second interval in which only the low-side (LS) switch of the SPS is ON. The PWM signal (or more typically, drive signals derived from the PWM signal) controls the opening and closing of high-side switch and low-side switch of the SPS. The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. As is well known in the relevant arts, the PWM signals to each SPS of a same multi-phase converter are staggered, i.e., delayed with respect to each other in phase such that typically no two high-side switches (and possibly low-side switches also) in the converter (i.e., respective SPSes) will be overlapping. Such a technique is employed for reasons such as, for example, to ensure that the peak instantaneous current drawing from Vin is relatively low at all times.

In an embodiment, signal PWM represents a tri-state input from phase controller 210. When logic LOW is detected by the SPS on signal PWM, the low-side switch is turned ON, and when logic HIGH is detected on signal PWM, the high-side switch is turned ON. A high-impedance (hi-Z) value on signal PWM is designed to turn OFF both the high-side and the low-side switches of the corresponding SPS. When an SPS is powered-up, a high-impedance (hi-Z) value is received on signal PWM for a certain duration before PWM starts to transition between the logic HIGH and logic LOW states noted above. An "initial transition" of signal PWM during power-up may therefore be regarded as transition from the hi-Z state to either HIGH state or LOW state.

Signal TMP is an output from an SPS to phase controller 210, and provides information regarding the temperature in the SPS. Phase controller 210 may process the TMP signal (or the information contained in it) to adjust the current supplied by that phase, or for shut-down of the VRM. The TMP outputs of each phase of a converter are wired together, and a single input is connected to phase controller 210.

Signal SYNC is an input to an SPS and may be used by phase controller 210 for the purposes of waking-up the SPS upon power-up of the power supply 110, and also to indicate the power-mode (e.g., PS2, PS3), i.e., output current requirement, of the multi-phase converter. Typically, all SPSes of the same converter share a single SYNC signal. Signal SYNC is received before signal PWM becomes active, i.e., starts to toggle/transition between logic HIGH and logic LOW states.

Signal CS (current sense) is an input to phase controller 210 from an SPS, and contains information regarding the magnitude of the inductor-current of that phase/SPS. The information can be in the form of a current, voltage, digital values, etc.

Each SPS is shown associated with a corresponding bootstrap capacitor to drive the high-side switch in the SPS.

As noted above, an SPS generates (or derives), from its PWM input, an HS-drive signal to open and close the HS switch, and an LS-drive signal to open and close the LS switch. The drive-signals are applied to the gate terminals of the respective switches. Ideally, the switching-OFF instants of the HS switch should coincide with switching-ON instants of the LS switch (and vice-versa.) to achieve zero dead-time. However, due to unpredictable propagation delays in the circuits (e.g., buffers, level shifters, etc.) implemented in the SPS to generate/derive the HS-switch and LS-switch drive signals, the ideal situation noted above might not be always be ensured. For example, one prior technique employs a pair of cross-coupled logic gates (e.g., AND gates) with output of each gate provided as an additional gating input to the other gate in an attempt to ensure no overlap in the drive signals (and therefore no shoot-through), and possibly also to achieve the ideal situation noted above. However, due to the unpredictable delays noted above, such a prior approach may not be able to achieve the ideal condition or even guarantee non-overlap of the drive signals.

Figure 3A:
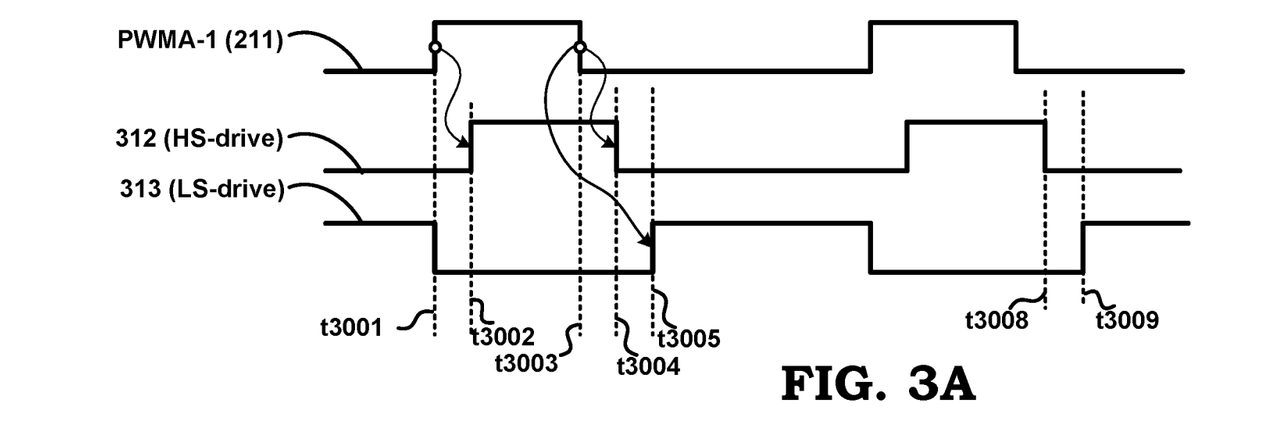
FIG. 3A is a timing diagram illustrating an example situation in which the dead-time has a large positive value.
Figure 3B:
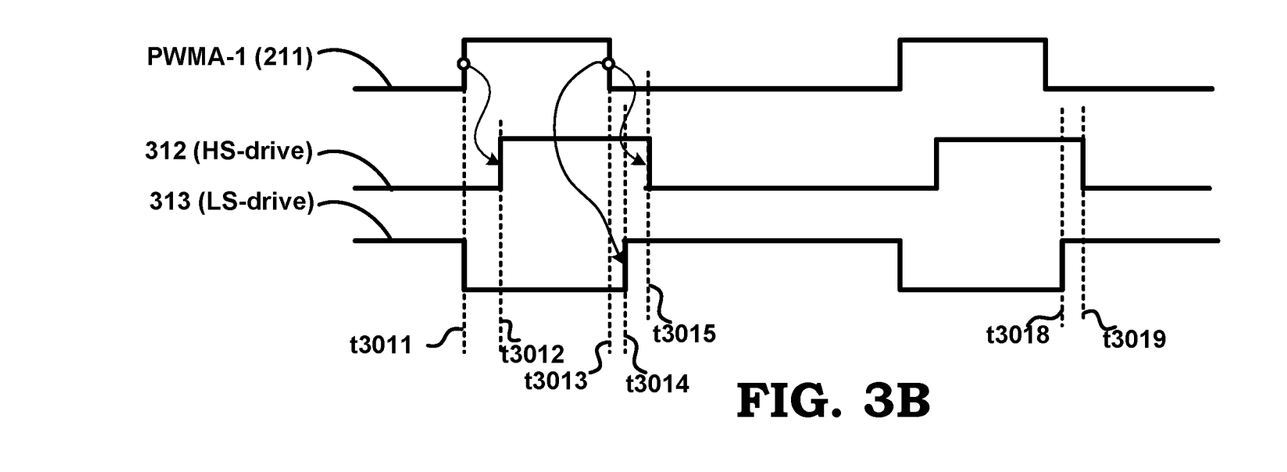
FIG. 3B is a timing diagram illustrating an example situation in which the dead-time has a large negative value and the ON-durations of the HS switch and LS switch overlap.

FIG. 3A illustrates an example situation in which the dead-time is positive and has a large value, while FIG. 3B illustrates an example situation in which the ON-durations of the HS switch and LS switch overlap, and the dead-time has a large 'negative' value. In both of FIGS. 3A and 3B, gate capacitances of the HS and LS switches have been ignored, as well as other diagrams and in the description herein, and ideal waveforms for the gate drive signals and therefore zero turn-ON and turn-OFF times for the HS and LS switches is shown in the interest of conciseness. However, the techniques of the present disclosure are applicable even when there are finite turn-ON and turn-OFF times for the HS and LS switches.

With respect to FIG. 3A, which shows waveforms for the duration of 2 cycles of PWMA-1, waveform 312 (HS-drive) represents the drive signal to the HS switch (not shown) of the SPS, and waveform 313 (LS-drive) represents the drive signal to the LS switch (not shown) of the SPS. Time instants t3001, t3002, t3003, t3004 and t3005 respectively represent the time instant of rising edge of PWMA-1, rising edge of HS-drive, falling edge of PWMA-1, falling edge of HS-drive, and rising edge of LS-drive of the first cycle.

As noted above, the time duration between end of ON phase of the HS switch and start of ON phase of the LS switch is the "falling dead-time". Generally, the "falling dead-time" corresponds to the changes in states of HS switch and LS switch in response to a falling edge of the corresponding PWM (pulse width modulated) signal (here PWMA-1) from which the switch control signals for the HS and LS switches are derived. Generally, the "rising dead-time" corresponds to the changes in states of HS switch and LS switch in response to a rising edge of the corresponding PWM (pulse width modulated) signal (here PWMA-1) from which the switch control signals for the HS and LS switches are derived.

Referring now to FIG. 3A, the interval t3004-t3005 represents the falling dead-time corresponding to the first cycle. Similarly, the interval t3008-t3009 represents the falling dead-time corresponding to the second cycle, and which may be equal to, or different from, the falling dead-time of the first cycle. In each of the two falling dead-times shown, at the instant of falling edge of HS drive, the voltage at the SWA-1 node becomes negative. When the voltage SWA-1 becomes less than the cut-in voltage (around 1 volt (V)) of the body-diode (between source and drain) of the LS switch, inductor-current continues to flow via the body-diode and load. This results in undesirable power-dissipation and reduction in efficiency of the switching converter.

As an example, a current of 20 amperes (A) flowing through the diode results in a power dissipation of 20 Watts (W) assuming the body-diode's forward voltage (assumed to be the same as the cut-in voltage) equals 1V. This power dissipation lasts until the LS-drive is asserted and LS-switch switches ON. Similar power-dissipation occurs in interval t3008-3009, and in general, in all dead-times longer than zero. Therefore, it is desirable to reduce the dead-time.

With respect to FIG. 3B, which shows waveforms for the duration of 2 cycles of PWMA-1, time instants t3011, t3012, t3013, t3014 and t3015 respectively represent the time instant of rising edge of PWMA-1 (as well as a falling edge of LS-drive), rising edge of HS-drive, falling edge of PWMA-1, rising edge of LS-drive and falling edge of HS drive of the first cycle of FIG. 3B. In falling dead-time represented by interval t3014-t3015, the dead-time is negative, both HS-drive and LS-drive are active and both of HS switch and LS switch are ON, which results in a large shoot-through current from Vin to ground. Similarly, flow of shoot-through current also occurs in falling edge-time interval t3018-t3009 (which is also negative). It is desirable to prevent such overlap in the active durations of HS-drive and LS-drive to avoid a shoot-through condition.

An SPS implemented according to several aspects of the present disclosure operates to optimize the falling dead-time as described next.

4. Smart Power Stage (SPS)

Figure 4:
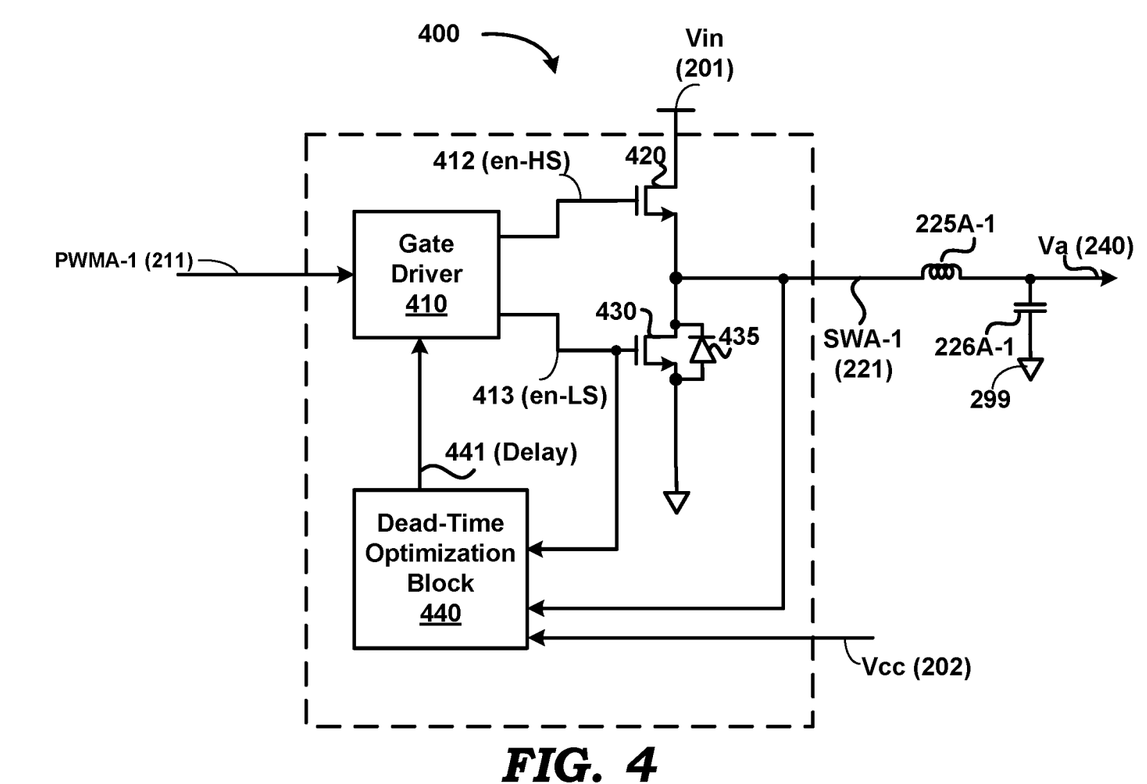
FIG. 4 is a diagram illustrating the implementation of a smart power stage (SPS) in an embodiment of the present disclosure.

FIG. 4 is a diagram illustrating the implementation of an SPS in an embodiment of the present disclosure. SPSA-1 (220-1) is shown in detail in FIG. 4. The other SPSes of FIG. 2 can also be implemented similar to SPSA-1. In the interest of conciseness, only those internal details of the SPS as relevant to the present disclosure are shown in FIG. 4. However, in other embodiments, and in general, an SPS can have more internal circuitry or blocks, such as temperature sensor, current sense, etc. SPSA-1 is shown containing gate driver 410, high-side (HS) switch 420, low-side (LS) switch 430, and dead-time optimization block 440. Also shown in FIG. 4 are inductor 225A-1 and capacitor 226A-1. Vin represents the supply source (as also shown in FIG. 2) and node 240 provides the regulated output voltage Va. Each of HS switch 420 and LS switch 430 may be implemented as transistors (typically power transistors). In the example of FIG. 4, both HS switch 420 and LS switch 430 are shown as N-type metal-oxide-semiconductor field-effect transistors (N-MOS). However, other types and combinations of components can also be used to implement switches 420 and 430. Diode 435 represents the body-diode of LS switch 430. Vcc (202) is provided to gate driver 410 and dead-time optimization block 440 for use as supply voltage for components and circuits therein.

Gate driver 410 receives PWMA-1 (211), and in response to the logic level of PWMA-1 generates the appropriate voltage to turn ON and turn OFF the corresponding ones of HS switch 420 and LS switch 430 in respective intervals "HS-interval" and "LS interval" of each cycle of operation indicated by PWMA-1. HS switch 420 and LS switch 430 are each shown implemented as a MOSFET (Metal Oxide Semiconductor Field Effect Transistor) with gate driver 410 driving the gate terminals of the MOSFETs, although other implementations for the switches are possible. In the example of FIG. 4, when PWMA-1 (211) is a logic high (i.e., active/asserted, corresponding to the HS-interval), gate driver 410 generates respective appropriate voltages on paths 412 (en-HS) and 413 (en-LS) to switch ON MOSFET 420 and switch OFF MOSFET 430. When PWMA-1 (211) is a logic low (inactive/de-asserted, corresponding to the LS-interval), gate driver 410 generates respective appropriate voltages on paths 412 and 413 to switch OFF MOSFET 420 and switch ON MOSFET 430.

Dead-time optimization block 440 receives as inputs the gate drive signal (en-LS) of LS switch 430, the voltage at node SWA-1 and Vcc (202), and generates signal 441 (Delay) provided as input to gate driver 410. Signal 441 (Delay) represents a duration (a length of time) by which the immediately next time rising edge of en-LS is to be delayed with respect to the default time of occurrence of the rising edge). Upon power-ON or RESET of SPSA-1, a default delay (typically zero, i.e., no delay) may be used for en-LS.

The 'closed loop' (shown in greater detail below in an embodiment) represented by the path from 'gate of LS switch' to 'block 440' to 'the relevant circuitry in gate driver 410' to 'gate of LS switch 430' operates to adjust the falling dead-time, as described below.

In an embodiment, dead-time optimization block 440 is always operative during operation of SPSA-1 to adaptively adjust the duration of the falling dead-time. Such dynamic adjustment of the falling dead-time may be needed since falling dead-time can change with temperature, supply voltage variations (here changes in Vcc 202), manufacturing process variation, etc. However, in other embodiments, dead-time optimization block 440 can be operative only in desired time durations that may be indicated suitably to SPSA-1.

When HS switch 420 is ON, the voltage at node SWA-1 equals Vin. Upon turning-OFF of HS switch 420, the voltage at node SWA-1 starts decreasing (from Vin). When en-LS is at logic high, LS-switch 430 is ON, and voltage SWA-1 equals zero volts (0 V).

If/when (or as long as) voltage SWA-1 is greater than a threshold voltage (Vth-1) (termed herein as condition-1), dead-time optimization block 440 concludes that either HS switch 420 is presently ON or that HS switch 420 has switched-OFF but voltage SWA-1 is not yet at 0V (i.e., voltage SWA-1 is still falling from Vin).

If/when (or as long as) voltage at node en-LS (413) is greater than a threshold voltage (Vth-2) (termed herein as condition-2), dead-time optimization block 440 concludes that LS switch 430 is ON. Vth-2 may be different from, or equal to, Vth-1 based on one or more of factors such as parameters of HS switch 420 and of LS switch 430 such as threshold voltages (VT) of the corresponding transistors, stray capacitances, etc. In an embodiment, Vth1 and Vth2 are each equal to or slightly greater than the threshold voltage (Vt) of the LS switch. Transistors 520 and 530 (noted with respect to FIG. 5 below) are selected to have each of their threshold voltages less than or substantially equal to Vt of the LS switch.

If/when voltage SWA-1 as well as en_LS are each greater than Vt (threshold voltage) of the LS switch, it means that LS switch is ON as well as SWA-1 node is high. Accordingly, dead-time optimization block 440 concludes that both HS switch 420 and LS switch 430 are ON, i.e., there is an overlap in the ON states of the two switches HS and LS. Consequently, dead-time optimization block 440 increases the delay of the rising edge of the LS gate drive signal en-LS. In the absence of any one, or both, of condition-1 and condition-2, dead-time optimization block concludes that there is no overlap in the ON states of the switches. Consequently, dead-time optimization block 440 decreases the delay of the LS gate drive signal en-LS. Thus, if overlap is detected the 'closed loop' increases the delay. On the other hand, when there is no overlap, the 'closed loop' reduces the delay. In the steady-state, the delay may toggle between a 'very-slight-overlap' condition and 'no-overlap' condition. Each increase and decrease of delay on path 441 may be set to a default value, or be changed dynamically using well-known techniques.

Figure 5:
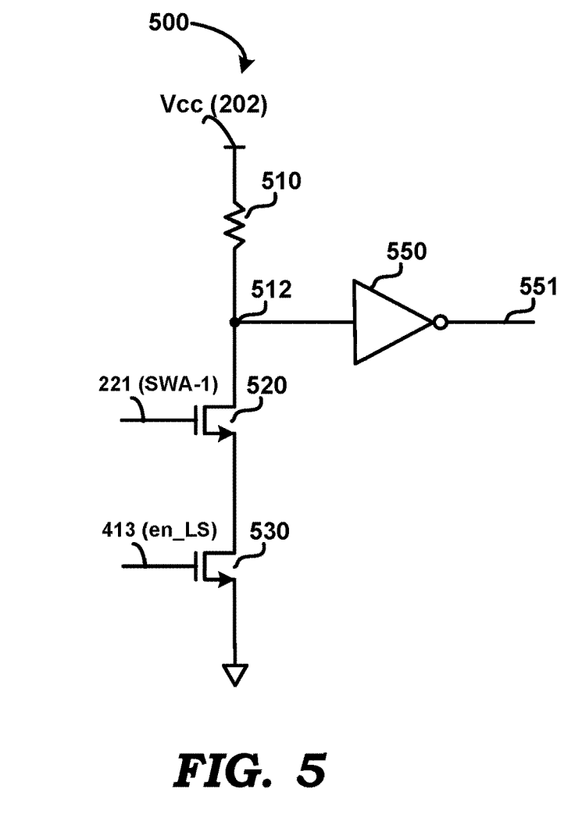
FIG. 5 is a circuit diagram of an overlap detector in an embodiment of the present disclosure.

In an embodiment of the present disclosure, condition-1 and condition-2 (noted above) are detected by an 'overlap-detector' using a pair of transistors whose respective gate terminals are connected to SWA-1 and en-LS. The example overlap-detector is shown in FIG. 5. Overlap-detector 500 of FIG. 5 is shown containing transistors 520 and 530 and pull-up element 510. Overlap-detector 500 may additionally contain inverter 550. As shown there, the series-combination of transistors 520 and 530 is connected between node 512 and ground. Node 512 is connected to supply voltage Vcc via a pull-up element. In FIG. 5, the pull-up element is shown implemented as a resistor 510. Other types of pull-up elements can also be used, such as for example, active elements like a diode-connected MOS (metal-oxide semiconductor) transistor.

In operation, when both SWA-1 and en-LS are greater than the threshold voltages (Vt) of transistors 520 and 530, node 512 is at logic LOW. When one or both of SWA-1 and en-LS is/are less than or equal to the respective threshold voltages, node 512 is at logic HIGH. Thus, the logic level of node 512 is an indicator of whether or not there is an overlap in the ON duration of HS and LS switches. Inverter 550 inverts the logic level of signal 512 to provide logic signal 551. Implementation of inverter 550 is optional.

Figure 6:
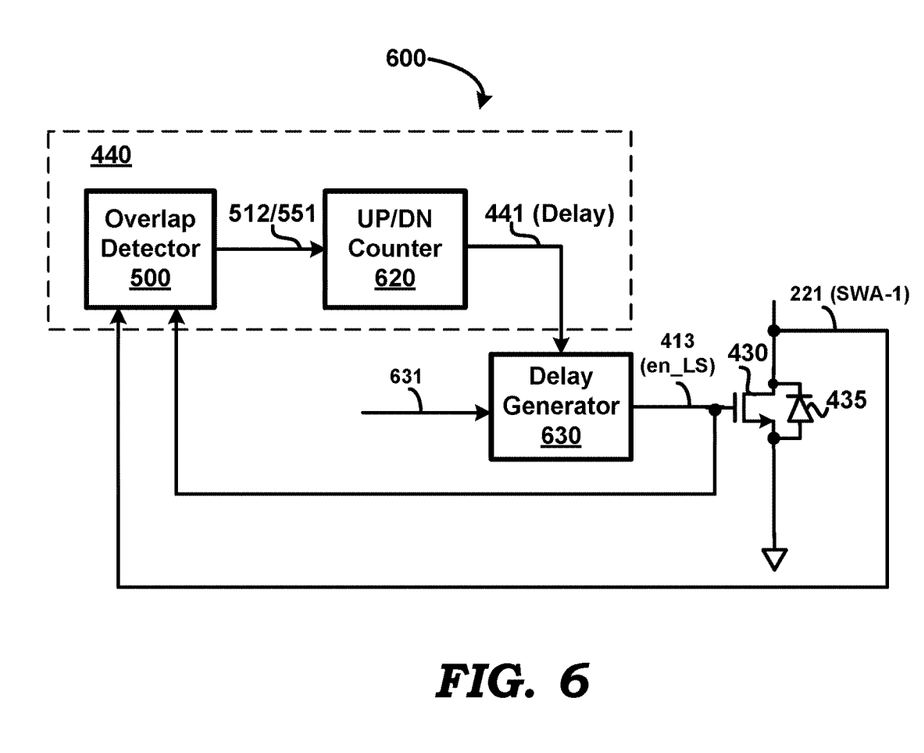
FIG. 6 is a block diagram illustrating the details of a control loop operative in an SPS to adjust falling dead-time, in an embodiment of the present disclosure.

FIG. 6 is a block diagram illustrating the details of the control loop operative in SPSA-1 to adjust falling dead-time. Control loop 600 is shown containing overlap detector 500, UP/DN counter 620 and delay generator 630. LS switch 430 is shown in addition for clarity. SWA-1 and en-LS are provided as inputs to overlap detector 500 as described above. The binary-level output of overlap detector 620, which may be either 512 or 551 (with appropriate modifications in UP/DN counter 620), is provided as input to UP/DN (up/down) counter 620.

UP/DN counter 620 increments its present count value by a pre-determined fixed-value if signal 551 is a logic HIGH (or signal 512 is a logic LOW). UP/DN counter 620 decrements its present count value by a pre-determined fixed value if signal 551 is a logic LOW (or signal 512 is a logic HIGH). UP/DN counter 620 may be implemented in a known way. Signal 441 (Delay) is the count value in UP/DN counter 620 after it increments or decrements its present value as noted above. It is noted that instead of incrementing and decrementing by fixed values (as noted above), UP/DN counter 620 can instead be implemented, in a known way, to apply increment and decrement values that can be dynamically increased or decreased, rather than remaining fixed.

In an embodiment of the present disclosure, delay generator 630 is implemented within gate driver 410, and receives signal 631 and delay value 441. Signal 631 represents an 'intermediate gate drive signal' for LS switch 430 that may be derived/generated by gate driver 410 in a known way based on PWMA-1. Delay generator 630 generates the delay specified by signal 441 to the rising edge of intermediate gate drive signal 631 to generate the rising edge of the (final) gate drive signal en-LS (413).

Delay generator 630 may be implemented in a known way, for example, using re-settable, initializable and programmable timers. The timers can be implemented to be responsive only to rising edges (but not falling edges) of intermediate gate drive signal 631, and thus generate the delay only when a rising edge of intermediate gate drive signal 631 is received. The timers forward falling edges of intermediate gate drive signal 631 without adding any delay. Other techniques for implementing delay generator 630 and its related functions can also be used as would be apparent to one skilled in the relevant arts upon reading the disclosure herein.

In another embodiment of the present disclosure, delay generator 630 is implemented as a part of dead-time optimization block 440, and receives the gate drive signal for the LS switch 430. In such an embodiment, signal 441 (delay) would be provided directly to delay generator 630, without having to be sent to gate driver 410.

Control loop 600 operates to dynamically adjust the falling dead-time to converge to the optimum dead-time. In an embodiment, upon convergence, the 'optimum dead-time' will toggle between a 'very slight overlap' condition (overlap in ON durations of HS and LS switches) and a 'no overlap' condition. Although not shown in FIG. 6, a deglitching circuit (deglitcher) may be provided optionally in the path between overlap detector 500 and UP/DN counter 620 to prevent glitches in the output of the overlap detector and to always ensure that falling dead-time has a non-zero lower-limit. That is, the 'no overlap' condition upon convergence is one in which a very small falling dead-time duration exists when such deglitcher is employed.

Figure 7:
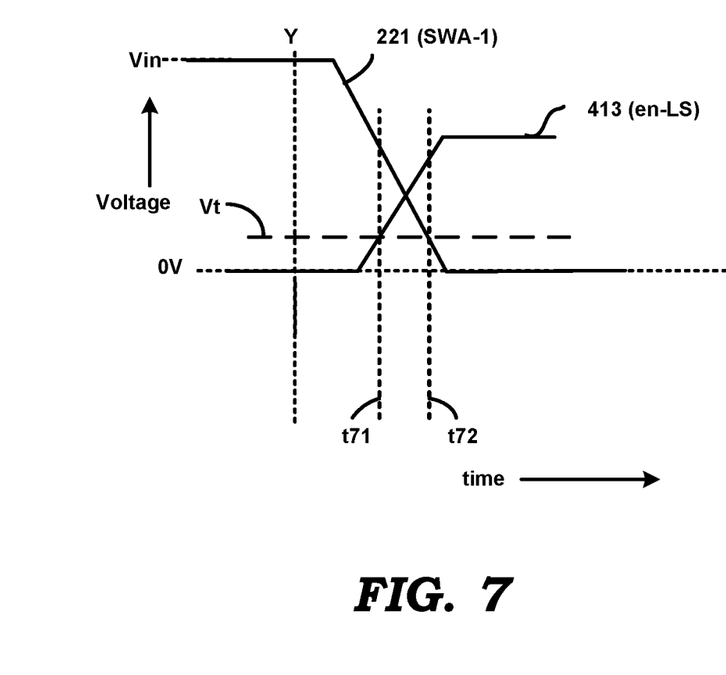
FIG. 7 is a diagram showing example waveforms for a pair of signals in an SPS in an embodiment of the present disclosure.

FIG. 7 is a diagram showing example waveforms for SWA-1 and en-LS. Voltage is represented on the Y-axis and time is represented on the X-axis. FIG. 7 is not to scale, and the specific waveforms are intended merely to illustrate. FIG. 7 shows voltage SWA-1 falling from Vin to 0V, and voltage en-LS changing from logic LOW to logic HIGH. Vt represents the threshold voltage of each of transistors 520 and 530 of FIG. 5. For the duration of interval t71-t72, both SWA-1 and en-LS are greater than Vt, indicating there is an overlap of ON-states of HS and LS switches. Control-loop 600 would accordingly operate as described above to add delay in the generation of the next rising edge of en-LS.

Figure 8:
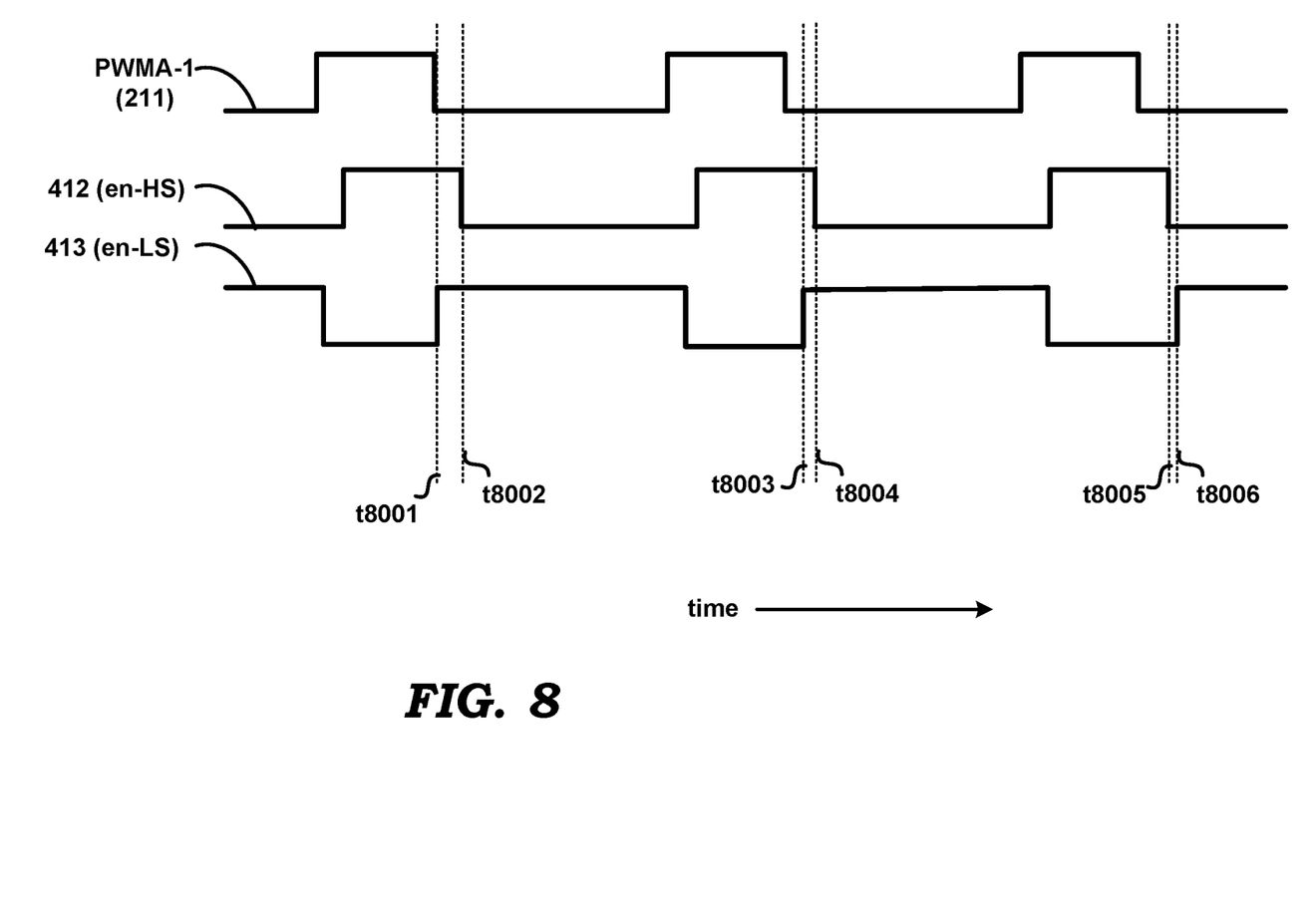
FIG. 8 is an example timing diagram illustrating the operation of a dead-time optimization block, and more generally, of a control loop, that is operative to adjust falling dead-time in an embodiment of the present disclosure In the drawings, like reference numbers generally indicate identical, functionally similar, and/or structurally similar elements. The drawing in which an element first appears is indicated by the leftmost digit(s) in the corresponding reference number.

FIG. 8 is an example timing diagram illustrating the operation of dead-time optimization block 440 or more generally of control-loop 600 in an embodiment of the present disclosure. Three cycles of PWMA-1 are shown there. It is assumed here that there is no delay between the edges of the gate drive signals (en-HS and en-LS) and the commencement of the ON or OFF state/phase of the corresponding switch. In the first cycle there is an overlap of ON states of HS switch 420 and LS switch 430 in the interval t8001-t8002. As noted above, it is desirable to prevent or at least minimize overlap between a high-side switch's ON phase and the low-side switch's corresponding ON-phase to prevent shoot-through current. Overlap detector 500 would detect the overlap of ON states of both LS and HS switch in interval t8001-t8002. Dead-time optimization block 440 or loop 600 in general, would therefore increase the delay of the rising edge of en-LS in the next cycle, in which the rising edge of en-LS is shown as occurring at t8003. The overlap t8003-t8004 is less than overlap t8001-t8002. Since in the second cycle, there is still some overlap (t8003-t8004), dead-time optimization block 440 would therefore again increase the delay of the rising edge of en-LS in the next cycle, in which the rising edge of en-LS is shown as occurring at t8006. Now there is no overlap, since the rising edge of en-LS occurs later than the falling edge of en-HS at t8005. Accordingly, dead-time optimization block 440 would therefore reduce the delay of the rising edge of en-LS in the next cycle (not shown).

Although in the description above, the rising edge of the LS switch gate-drive signal is noted as being delayed to optimize the falling dead-time, it may be appreciated that the same goal of adjusting falling dead-time can instead be achieved by adjusting (only) a delay of the falling edge of the HS switch gate drive signal en-HS (412) by inverting the UP/DN logic, and applying the resulting delay value in the HS gate drive path. Thus, a control loop to adjust falling dead-time by adjusting delay of HS switch gate drive signal would increment the UP/DN counter when no overlap is indicated (using the same logic as described above), and decrement the UP/DN counter when overlap is indicated, as would be apparent to one skilled in the relevant arts upon reading the disclosure herein. In such an embodiment, the delay generator would be in the path from gate driver's HS drive signal output to gate terminal of the HS switch.

Alternatively, the falling dead-time adjustment can be performed by a combination of delaying rising edges of low-side drive signal and delaying falling edges of the high-side drive signal, as would be apparent to a skilled practitioner upon reading the disclosure herein.

Due to the operation of the falling dead-time control loop, the disadvantages noted above with respect to falling dead-time durations can be overcome. Further, the circuitry, specifically, overlap detector 500, is very simple to implement, and requires minimal implementation area when incorporated in an integrated circuit (IC) and low-power consumption.

5. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 4, 5 and 6, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors with similar characteristics will be apparent to one skilled in the relevant arts by reading the disclosure provided herein.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A switching converter comprising:
a high-side switch and a low-side switch coupled in series at a series node, and together operable to generate an output voltage at an output node based on an input voltage received at an input node;
a gate driver block to drive a control terminal of said high-side switch by a high-side drive signal to cause said high-side switch to be ON or OFF, said gate driver block to drive a control terminal of said low-side switch by a low-side drive signal to cause said low-side switch to be ON or OFF;
a first transistor, a second transistor, and a pull-up element, wherein a series arrangement of said first transistor and said second transistor is coupled between a first terminal of said pull-up element and a first constant reference potential, wherein a second terminal of said pull-up element is coupled to a second constant reference potential, wherein a control terminal of said first transistor is coupled to said series node, wherein a control terminal of said second transistor is coupled to said control terminal of said low-side switch, wherein a voltage at a junction of said pull-up element and said series arrangement represents a binary-level overlap indicator that indicates whether an ON-duration of said high-side switch overlaps with an ON-duration of said low-side switch.

2. The switching converter of claim 1, further comprising an inverter, wherein an input of said inverter is coupled to said junction of said pull-up element and said series arrangement, wherein an output of said inverter indicates whether said ON-duration of said high-side switch overlaps with said ON-duration of said low-side switch.

3. The switching converter of claim 1, wherein said first transistor, said second transistor and pull-up element form an overlap detector, wherein said overlap detector is comprised in a dead-time optimization block, wherein said dead-time optimization block is operable, based on a logic level of said overlap indicator, to control timing of said low-side switch going from said OFF state to said ON state, and/or of said high-side switch going from said ON state to said OFF state.

4. The switching converter of claim 3, wherein said dead-time optimization block further comprises an up/down counter coupled to receive said overlap indicator, said up/down counter to increment a present count value to form an updated delay count if said overlap indicator indicates overlap, said up/down counter to decrement said present count value to form said updated delay count if said overlap indicator indicates no overlap, wherein said updated delay count is provided as an output of said dead-time optimization block to perform said control of said timing.

5. The switching converter of claim 4, wherein said gate driver block comprises a delay generator coupled to receive said low-side drive signal and said updated delay count, wherein said delay generator is operable to delay a next rising edge of said low-side drive signal for a duration specified by said updated delay count, wherein said delayed rising edge is applied to said control terminal of said low-side switch.

6. The switching converter of claim 3, wherein said dead-time optimization block further comprises an up/down counter coupled to receive said overlap indicator, said up/down counter to decrement a present count value to form an updated delay count if said overlap indicator indicates overlap, said up/down counter to increment said present count value to form said updated delay count if said overlap indicator indicates no overlap, wherein said updated delay count is provided as an output of said dead-time optimization block to perform said control of said timing.

7. The switching converter of claim 6, wherein said gate driver block comprises a delay generator coupled to receive said high-side drive signal and said updated delay count, wherein said delay generator is operable to delay a next falling edge of said high-side drive signal for a duration specified by said updated delay count, wherein said delayed falling edge is applied to said control terminal of said high-side switch.

8. A switching converter comprising:

a high-side switch and a low-side switch coupled in series at a series node, and together are operable to generate an output voltage at an output node based on an input voltage received at an input node;

a gate driver block to drive a control terminal of said high-side switch by a high-side drive signal to cause said high-side switch to be ON or OFF, said gate driver block to drive a control terminal of said low-side switch by a low-side drive signal to cause said low-side switch to be ON or OFF; and a dead-time optimization block to detect any overlap of an ON duration of said high-side switch with that of said low-side switch, said dead-time optimization block to, responsive to said overlap, control timing of said low-side switch going from said OFF state to said ON state, and/or of said high-side switch going from said ON state to said OFF state to avoid future overlap of ON durations of said high-side switch and said low-side switch, wherein said dead-time optimization block comprises an overlap detector to detect said overlap of said ON duration of said high-side switch with that of said low-side switch, said overlap detector comprising:

a first transistor, a second transistor, and a pull-up element, wherein a series arrangement of said first transistor and said second transistor is coupled between a first terminal of said pull-up element and a first constant reference potential, wherein a second terminal of said pull-up element is coupled to a second constant reference potential, wherein a control terminal of said first transistor is coupled to said series node, wherein a control terminal of said second transistor is coupled to said control terminal of said low-side switch, wherein a voltage at a junction of said pull-up element and said series arrangement represents a binary-level overlap indicator that indicates whether said ON-duration of said high-side switch overlaps with said ON-duration of said low-side switch.

9. The switching converter of claim 8, wherein said dead-time optimization block further comprises an up/down counter coupled to receive said overlap indicator, said up/down counter to increment a present count value to form an updated delay count if said overlap indicator indicates overlap, said up/down counter to decrement said present count value to form said updated delay count if said overlap indicator indicates no overlap, wherein said updated delay count is provided as an output of said dead-time optimization block to perform said control of said timing.

10. The switching converter of claim 9, wherein said gate driver block comprises a delay generator coupled to receive said low-side drive signal and said updated delay count, wherein said delay generator is operable to delay a next rising edge of said low-side drive signal for a duration specified by said updated delay count, wherein said delayed rising edge is applied to said control terminal of said low-side switch.

11. The switching converter of claim 8, wherein said dead-time optimization block further comprises an up/down counter coupled to receive said overlap indicator, said up/down counter to decrement a present count value to form an updated delay count if said overlap indicator indicates overlap, said up/down counter to increment said present count value to form said updated delay count if said overlap indicator indicates no overlap,
wherein said updated delay count is provided as an output of said dead-time optimization block to perform said control of said timing.

12. The switching converter of claim 11, wherein said gate driver block comprises a delay generator coupled to receive said high-side drive signal and said updated delay count,
wherein said delay generator is operable to delay a next falling edge of said high-side drive signal for a duration specified by said updated delay count, wherein said delayed falling edge is applied to said control terminal of said high-side switch.

13. A voltage regulator module (VRM) comprising:
a phase controller to generate a regulated supply voltage on a first supply node;
a first inductor coupled to the first supply node; and
a first smart power stage (SPS) comprising:
 a high-side switch and a low-side switch to respectively drive the first inductor in a first phase and a second phase periodically; and
 a gate driver block to drive a control terminal of said high-side switch by a high-side drive signal to cause said high-side switch to be ON or OFF, said gate driver block to drive a control terminal of said low-side switch by a low-side drive signal to cause said low-side switch to be ON or OFF; and
 a dead-time optimization block to detect any overlap of an ON duration of said high-side switch with that of said low-side switch,
said dead-time optimization block, responsive to said overlap, to control timing of said low-side switch going from said OFF state to said ON state, and/or of said high-side switch going from said ON state to said OFF state to avoid future overlap of ON durations of said high-side switch and said low-side switch,
 wherein said dead-time optimization block comprises an overlap detector to detect said any overlap of ON duration of said high-side switch with that of said low-side switch,
 said overlap detector comprising:
 a first transistor, a second transistor, and a pull-up element,
 wherein a series arrangement of said first transistor and said second transistor is coupled between a first terminal of said pull-up element and a first constant reference potential,
 wherein a second terminal of said pull-up element is coupled to a second constant reference potential,
 wherein a control terminal of said first transistor is coupled to said series node,
 wherein a control terminal of said second transistor is coupled to said control terminal of said low-side switch,
 wherein a voltage at a junction of said pull-up element and said series arrangement represents a binary-level overlap indicator that indicates whether said ON-duration of said high-side switch overlaps with said ON-duration of said low-side switch.

14. The VRM of claim 13, wherein said dead-time optimization block further comprises an up/down counter coupled to receive said overlap indicator, said up/down counter to increment a present count value to form an updated delay count if said overlap indicator indicates overlap, said up/down counter to decrement said present count value to form said updated delay count if said overlap indicator indicates no overlap,
wherein said updated delay count is provided as an output of said dead-time optimization block to perform said control of said timing.

15. The VRM of claim 14, wherein said gate driver block comprises a delay generator coupled to receive said low-side drive signal and said updated delay count,
wherein said delay generator is operable to delay a next rising edge of said low-side drive signal for a duration specified by said updated delay count, wherein said delayed rising edge is applied to said control terminal of said low-side switch.

16. The VRM of claim 13, wherein said dead-time optimization block further comprises an up/down counter coupled to receive said overlap indicator, said up/down counter to decrement a present count value to form an updated delay count if said overlap indicator indicates overlap, said up/down counter to increment said present count value to form said updated delay count if said overlap indicator indicates no overlap,
wherein said updated delay count is provided as an output of said dead-time optimization block to perform said control of said timing.

17. The VRM of claim 16, wherein said gate driver block comprises a delay generator coupled to receive said high-side drive signal and said updated delay count,
wherein said delay generator is operable to delay a next falling edge of said high-side drive signal for a duration specified by said updated delay count, wherein said delayed falling edge is applied to said control terminal of said high-side switch.

* * * * *